3,117,106
WATER DISPERSIBLE ACID FORM MELAMINE-FORMALDEHYDE RESINS
Henry P. Wohnsiedler, Noroton, Conn., assignor to American Cyanamid Company, New York, N.Y., a corporation of Maine
No Drawing. Filed Dec. 22, 1959, Ser. No. 861,175
11 Claims. (Cl. 260—67.6)

This invention relates to novel amino triazine based compositions of matter characterized by being either electrolytes or polyelectrolytes. The present invention more specifically concerns essentially dry resinous or non-resinous formaldehyde condensates of an amino(s)triazine compound including melamine, N-substituted melamines and various water-soluble guanamines, said condensates existing in a stable acid form and capable of dissociating into two or more ions when dissolved or dispersed in water.

Thermosetting cationic amino triazine-formaldehyde condensates as a particular class of resinous materials are well known in the art and as such have enjoyed considerable commercial importance. The members of this special class of condensates are used for a variety of purposes and applications; however, their principal use has been in the field of paper chemistry wherein they are utilized to prepare wet-strength paper.

In brief, the method ordinarily practiced in preparing wet-strength paper consists of combining and mixing a dilute aqueous solution of the cationic resin with an aqueous slurry of cellulose paper making fibers containing the usual loading materials such as alum, rosin size, pigments, etc. that may be desirably employed and thereupon sheeting the stock followed by drying the felted product with the application of heat. In the course of the treatment of the cellulosic fibers as described a substantial proportion of the cationic resin introduced into the stock is absorbed by the fibers and is eventually converted to a thermoset stage during the drying operation. The effect of the absorbed resin when present in a thermoset form within the interstices of the dried paper is to bond a substantial portion of the fibrils together, thus producing a water-resistant bond between the paper fibers and accordingly imparting wet-strength to the cellulosic sheet. A substantial increase in the folding endurance of the paper is also attained in this treatment.

The cationic amino triazine resins as known in the art are composed of two distinct types. One of these principal types is represented by the condensates of an amino triazine and formaldehyde which have been rendered substantive to negatively charge materials such as cellulosic fibers by suitable chemical modification of the condensate. The modified type of cationic condensates is exemplified in U.S. Patent No. 2,769,799 wherein a resin such as a melamine-formaldehyde condensate is reacted with a polyalkylen polyamine, e.g., tetraethylene pentamine or the reaction products of said polyamines with difunctional halohydrins.

The other principal class of cationic amino triazine resins, which class is the forerunner of resinous materials of this type, is the so-called acid colloids. The acid type colloids of said triazine resins are exemplified in U.S. Patents 2,345,543 and 2,356,718 among others. These cationic condensates are in essence the reaction or association product of an aqueous syrup of a formaldehyde condensation or reaction production of melamine or other amino triazines and a water-soluble acid, the latter used in substantial quantities ranging from about 0.5 to 3.5 mols thereof for each mol of melamine or amino triazine contained by the condensation product. In order to realize optimum cationic qualities, the acid solutions described may be converted into a colloidal condition by reaction or aging the solution. The aging or reaction procedure further effects a degree of condensation less than that which characterizes gels and precipitates but sufficient to advance the condensates to within the colloidal range. After said aging or reaction period the resultant colloidal particles are not only merely substantive to negatively charged materials but are further characterized by exhibiting a definite positive electrical charge.

It is with respect to the above-mentioned acid-type colloids and particularly with respect to the use of such condensates in preparing wet-strength papers that this instant invention is in part concerned. Certain compositions encompased by this invention accordingly represent an improvement over the prior art cationic acid colloids in a number of regards. A serious limitation of the prior art acid colloids was that because of their poor stability they had to be prepared immediately before the contemplated use thereof. In other words, once the water-soluble amino triazine condensate was treated with an acid and the ensuing aging operation observed, the so-produced colloid had to be used in a relatively short time or else progressive condensation of the cationic resin would result in a useless product. Therefore, the procedure for preparing the acid colloid necessarily fell to the lot of the paper maker. The disadvantages experienced by the paper maker, particularly in handling large quantities of highly corrosive materials such as the strong acids generally employed to prepare the colloids, are of considerable and practical concern. In this regard it is to be mentioned that the resin manufacturer could not prepare the acid colloid and supply same direct to the paper manufacturer in a dried form because prior to my invention it was not known how to dry the acid colloid dispersions without converting the material to a thermostat condition and consequently unuseable form.

The cationic compositions of this invention, on the other hand, may be dried before or after the aging or reaction period necessary to impart a relatively high degree of cationic properties to the dispersion. The substantially dry cationic resins obtained in the process of this invention may nevertheless be readily redispersed in water. The cationic resins of my invention may also be stored indefinitely in the dry state without their characteristic qualities being adversely affected in any significant manner. While the practice of this invention provides a novel class of polyelectrolytes, that is, either colloidal or noncolloidal cationic resins having a special utility as aforedescribed, I further contemplate as an important aspect of my discovery reaction products of an amino triazine and formaldehyde in acid form, which products are nonresinous in nature and may be considered as simple electrolytes. These electrolytes are not particularly suitable for use in preparing wet-strength paper or providing a finish for textiles, however, they have utility as an intermediate in preparing resinous compositions having a broad range of applicability.

From a formulation standpoint, the compositions of this invention differ from the acid-form materials of the prior art merely with regard to the ratio of formaldehyde to melamine employed in preparing the initial condensation product. I have made the surprising discovery that if a molar ratio of amino triazine to formaldehyde in the order of one is utilized in preparing a condensate thereof, these condensates may then be readily converted to dry acid-form cationic resins. As indicated, the observance of a critical and narrow molar ratio range of amino triazine and formaldehyde is to be observed in order to realize the objectives of this invention. More particularly in this regard, the molar ratio of formaldehyde to amino triazine may not exceed about 1.2. The lower ratio of formaldehyde to amino triazine that may be suitably employed is approximately 0.9. Employing a ratio significantly less than 0.9 on the above-stated basis will result in condensates which are lacking in water solubility properties whereas employing a ratio of greater than 1.2 results in cationic compositions approaching the characteristics of the prior art materials and consequently having the aforesaid disadvantages that are associated with those materials.

A number of different amino triazines may be satisfactorily employed in order to prepare the novel compositions of this invention. A specific enumeration of those that may be used include: melamine; N-substituted alkyl melamines such as mono-, di- and tri-alkyl melamines including monomethylmelamine, $N^2$-dimethylmelamine and sym-trimethylmelamine, N-substituted aryl melamines such as mono- and di-aryl melamines such as monophenylmelamine and $N^2,N^4$-diphenylmelamine; the various water-soluble guanamines, e.g., formoguanamine, acetoguanamine, propionoguanamine and the N-substituted water-soluble guanamines such as 4-N-methyl- or 4-N-ethyl-2-acetoguanamines, etc. Of the variety of amino triazines that may be suitably employed in the practice of my invention, melamine represents the preferred triazine.

The method to be employed in reacting the amino triazine with the formaldehyde generally consists of reacting under heat and alkaline conditions to effect methylolation of the triazine and condensation of the resultant formals if desired. The condensation reaction, however, should not be carried out to an extent so as to cause the condensate to evidence water insolubility properties. A suitable condensation reaction temperature may range from about 20° C. to the reflux temperature. Applicable pH conditions for the condensation reaction may range from pH 6.0 to pH 12.

The condensation should be carried out in an aqueous system, since ultimately an aqueous solution of the condensate is needed in order to properly facilitate the treatment of the condensate with an acid in utilizing the preferred method of obtaining my novel compositions. The condensation reaction may be conducted by a one-step process wherein the condensation reactants are initially charged into the reaction sphere. However, in such a procedure when an amino triazine such as melamine is employed it is necessary to operate at relatively low reactant solids, that is, in the order of about 10%. Operation at these lower solids is required because of the low ratios of formaldehyde to melamine contemplated in producing the condensates of this invention. In the preparation of the instant type condensates, the melamine capable of dissolving will react with the formaldehyde beyond the monomethylolation stage provided that there is not sufficient amount of water present to substantially dissolve the melamine reactant. In order to obviate obtaining a reaction product consisting of a mixture of unreacted melamine together with methylolated derivatives thereof, it is necessary to conduct a one-stage method with a substantial amount of water present, namely, in the order of approximately 90% of the reaction system as water. Since in accordance with this invention, the aqueous reaction syrup is to be eventually dehydrated, the required use of large quantities of water in the one-stage method poses an economical disadvantage apart from the disadvantage of low product output inherent in such a method. The disadvantages of the aforesaid method of preparing the instant condensates may be obviated by employing a process method which is exemplified in my U.S. Patent No. 2,841,571. In said process all of the melamine is charged to the reaction sphere and the formaldehyde is added in stages, that is, in a series of $n$ steps where $n$ is an integer of at least 2. In practicing this method $1/n$th of the total amount of formaldehyde is charged initially and after this amount has suitably reacted additional equal amounts are added and similarly reacted until there is complete utilization of the total formaldehyde reactant. Ordinarily in the observance of this process two or three additions of the formaldehyde are adequate in realizing the beneficial features of the method. By this procedure one can operate with a reaction system which will upon completion contain as high as about 35% resin solid. Further details regarding the preparation of the condensates of this invention by the above-described method involving the multistage addition of the formaldehyde reactant will be given in the specific examples set forth hereinbelow.

After the preparation of the amino triazine-formaldehyde condensate, an aqueous solution thereof is reacted with an acid. The most desirable acid for this purpose which I have found and accordingly the preferred acid in preparing the novel compositions of this invention is hydrochloric. A suitable amount of hydrochloric acid ranges from about 0.7 to 1.3 mols per mol of the amino triazine contained by the condensate. Hydrochloric acid can be used in the practice of this invention irrespective of the particular type of condensate being treated to yield the electrolyte or polyelectrolyte thereof, that is, irrespective of the type of triazine component from which the condensate is derived. Other acids are adaptable for use in preparing the compositions of this invention; however, whether an acid other than hydrochloric is suitable depends upon the nature of the condensate, and more particularly the type of amino triazine employed to prepare the condensate. With the foregoing in mind, other water-soluble acids that may be used include such as trichloracetic, sulfuric, lactic, phosphoric and the like. For the latter acids it may be desirable to employ larger molar amounts than with hydrochloric acid in order to secure the degree of solubility and cationic properties desired. Therefore, a suitable range for these acids is from about 0.7 to 3.0 mols per mol of amino triazine contained by the resinous condensate.

The reaction whereby the acid reacts or associates with the amino triazine condensate is preferably carried out under moderate heating conditions such as in the range of from about 20 to 75° C. Also, it is preferred that the solids of the aqueous syrup being treated with the acid be not greater than about 65%. The time required for reacting the acid with the condensate is a variable but seldom exceeds about 24 hours when the reaction is conducted in a temperature range of from about 20 to 50° C. Generally the period over which reaction is carried out subsequent to the addition of the acid will depend on the use to which the product will be put. Upon the addition of the acid an electrolyte is formed due to the neutralization of the amino triazine base by the acid and the product may be regarded as a type of substituted ammonium salt. With further reaction polymerization takes place with formation of a polyelectrolyte which then exhibits cationic properties. After the acid has adequately reacted with the condensate in the manner described the coreaction product can be immediately dried or alternatively, it may be aged in order to impart a higher degree of cationic properties to the reaction product if so desired.

The foregoing method for preparing the electrolytes or polyelectrolytes of this invention represents the preferred procedure. The preference indicated is primarily due to the fact that this procedure is conveniently applicable irrespective of the type of amino triazine employed. Alternatively, when a water-soluble type of amino triazine is employed such as the guaranamines specifically enumerated hereinabove, one can charge initially all ingredients including the acid and the reaction can be carried out to the extent desired. This alternative one-step method cannot be used with any substantial degree of efficiency when a rather insoluble amino triazine such as melamine is employed.

The elapsed time necessary of aging clear solutions of the acidified amino triazine-formaldehyde condensate products to a colloidal condition in which they carry a positive electrical charge is dependent upon the aging conditions employed. In general, the aging process is shortened by increasing either the temperature or the concentration of the acid resin solution, or both. Suitable temperatures for effecting the formation of charged colloidal particles range from about 20 to 75° C. Ordinarily it is preferred that the solids content of the solution being aged be in the order of from about 10 to 50%.

The drying of the cationic acid colloid or the acidified condensate which is not subjected to said aging process may be accomplished in a variety of ways, preferably at a temperature not exceeding about 65° C. The extent of dehydration contemplated herein may be effected by tray drying, spray drying, drum drying or any other suitable known method wherein moderate heat conditions are employed.

As mentioned previously, the dried resinous compositions of this invention are particularly useful in the preparation of wet-strength papers. Nevertheless, their usefulness is not limited to this field. They may be also used in preparing resin intermediates for molding and laminating applications or they may be advantageously employed to treat textiles and a variety of other substrates such as for example regenerated cellulose, which treatment improves the affinity of the cellulosic substrate for subsequently applied top coats, such as a water-proofing coating of nitrocellulose. They may be also utilized as intermediates in the preparation of other resinous materials having unique chemical properties. Therefore, in light of the varied applications in which the compositions of this invention may be beneficially employed, I contemplate the dried acidified condensates having non-colloidal characteristics as well as those whose polymerization has been advanced to a degree whereby the condensates will exhibit colloidal properties when dispersed in water.

However, should either of the two types of acidified resinous condensates be used in preparing wet-strength paper there are certain recommended practices to be observed for optimum efficiency of purposes. In the case of the acidified condensate not of a colloidal nature, an aqueous solution thereof, preferably dilute, should be aged or reacted for the requisite time necessary to effect a colloidal condition prior to adding the dispersion to the beater. It is further recommended that this aging or reaction step be carried out in the presence of additional quantities of formaldehyde in the order of about 1 to 10 times the amount associated with the original condensate.

Even if the acidified condensates prepared in accordance with this invention had been previously aged in order to impart colloidal properties thereto, it is highly desirable to add additional quantities of formaldehyde ranging up to about 10 mols of formaldehyde per mol of the amino triazine present before their use as beater additives. This is so because the presence of additional amounts of formaldehyde enhances the thermosetting characteristics of my relatively low formaldehyde content compositions. These fortified colloidal solutions intended for use to impart wet-strength properties to paper may be further aged so long as any additional aging procedure observed does not cause the condensate to go beyond the colloidal stage and result in a useless gel or precipitated product.

In order that those skilled in the art may better understand how the present invention may be practiced the following examples are given in which all parts are parts by weight. It is to be understood that these examples are given by way of illustration only and any specific enumeration of details set forth therein should not be interpreted as a limitation on the case except as is indicated in the appended claims.

*Example I*

The preparation of a resinous condensate having a melamine to formaldehyde ratio of 1:1 employing a three-stage reaction method was accomplished in the following manner. Into a suitable reaction vessel equipped with stirrer, thermometer and reflux condenser were charged 946 parts melamine, 243 parts of an aqueous formaldehyde solution (37% formaldehyde and 7% methanol) and 3136 parts of water. The charge as stated together with 4 parts of 0.5 N sodium hydroxide was heated in 45 minutes to the reflux temperature (102° C.) and then sampled. The glass electrode pH of the reaction system was 8.9 (measured at 25° C.). A second addition of aqueous formaldehyde consisting of 243 parts thereof was made and heating continued at a temperature of 95–101° C. for an additional 30 minutes. The pH of the reaction system after the indicated holding period had dropped to 8.6. The final portion of formaldhyde solution amounting to 122 parts was then added to the reaction sphere followed by the addition of 4 parts of 0.5 N sodium hydroxide, the addition of the latter causing the pH to rise to 8.9. Heating was continued at reflux temperature for 58 minutes whereupon the condensate reached a certain degree of hydrophobic character as indicated when two drops thereof resulted in a blue haze when added to 25 mililiters of water at 0–3° C. Fourteen parts of 0.5 N sodium hydroxide was then added to the reaction product and the syrup cooled to room temperature. After standing for 24 hours at room temperature the resin syrup was filtered in order to remove a small quantity (15 parts) of insolubles that had formed. The solids content of the final resinous syrup was 25%.

One hundred and twenty-six parts of the resinous syrup described above were charged to a suitable reaction vessel together with 20.2 parts concentrated hydrochloric acid and 46 parts of water. These ingredients were then heated to 50° C. at which point the turbid mixture cleared. Heating was continued at 68–73° C. for 1 hour and 20 minutes following which heating period the solution was cooled to room temperature. The resultant product in the form of a pasty, vaseline-like mass having a glass electrode pH of 1.7 was aged for four days at room temperature following which aging period it was tray dried at 95° F. to a coarse granular form. The dried product was then finely subdivided in a Labconco mill. The product remained water dispersible in its dry state and when retested after 18 months it evidenced no impairment in this property since heating to boiling brought about its resolution. A 10% aqueous solution thereof exhibited a definite Tyndall effect.

*Example II*

An acid resin was prepared in substantially the same manner as given in Example I employing a formaldehyde to melamine ratio of 1:1. The final aqueous resin product was recovered in dry, granular form by spray drying at 225 to 275° F. In testing this product as a paper additive the dried resin was redispersed at 10% solids concentration in water by heating to the boiling temperature and immediately cooling to room temperature.

Bleached northern Kraft pulp was formed into an aqueous suspension at 0.6% consistency, to which suspension was added 1% alum based on the weight of the fibers contained therein. To the furnish was added the resin solution product of this example in the amount of 3% solids based on the weight of the fiber content of the furnish. The treated pulp was then made into hand sheets on a standard hand sheet machine. The sheets were dried on a rotary drum for 1 minute at 240° F. The wet tensile strength values of the sheets were then determined by the TAPPI method after conditioning the sheets by soaking them 16 hours in demineralized water at room temperature. The wet-strength figure value obtained for the paper prepared in the manner recounted herein was 4.7 pounds per inch. The wet-strength value obtained for a paper prepared from untreated fiber was approximately 0.5 pound per inch.

*Example III*

Propioguanamine (55.5 parts, 0.4 mole) 32.5 parts of neutral 37% aqueous formaldehyde (0.4 mole) and 24 parts of water were slurried, adjusted in pH to 9.5 with N/2 sodium hydroxide and heated at 75° for one hour. After this time reaction of the formaldehyde was substantially complete. The product, in slurry form and having a concentration of 60% solids was divided into four equal parts, each equivalent to 0.1 mole of the guanamine. To part (A) 16.3 parts of trichloracetic acid (0.1 mole) were added, to (B) 10.6 parts 85% lactic acid (0.1 mole) were added, to (C) 5.1 parts 90% formic acid (0.1 mole) were added and to (D) 10.1 parts 36% hydrochloric acid (0.1 mole) were added. Each composition in addition was diluted with water to 40% non-aqueous content and then reacted in the acid state by heating at 50° for one half hour. The glass electrode pH values observed for the compositions prepared from parts (A), (B), (C) and (D) were 1.2, 2.4, 2.8 and 1.9, respectively. Following the heating period each composition was tray dried at 50° over a period of 16 hours. The appearance of the solids varied from that of a crystalline state to a clear resinous or a subdivided white, solid state. Each could be subdivided further by grinding. The subdivided products were tested for solubility. Composition (D) dissolved readily in water at 25% concentration and also at 50% strength by warming. Composition (A) dissolved at 25% concentration at 50° and (B) dissolved in alcohol-water medium plus a slight excess of lactic acid by heating to 50° whereas (C) proved to have only slight solubility.

*Example IV*

Formoguanamine was converted to an intermediate having the nature of the monomethylol derivative substantially as described in Example III. This was then reacted as in Example III with various acids by heating one half hour at 50°. Drying to the solid form followed. In this case dry compositions having one mole of hydrochloric acid or one mole of sulfuric acid per mole of formoguanamine dissolved readily at 25–50% concentration in water.

*Example V*

Monomethylmelamine (14.0 parts, 0.1 mole) together with 3.0 parts formaldehyde (0.1 mole) were reacted in aqueous solution at a concentration of 50% of reactants. The solution adjusted at a pH value of 10.6 with a small amount of sodium bicarbonate-sodium hydroxide buffer was heated 30 minutes at 60°. Concentrated hydrochloric acid was then added specifically, 10.1 parts (0.1 mole) and heating continued at 60° for 1 hour. The clear solution with pH value 1.8 on cooling reversibly precipitated gelatinous solids. It dried at 25° to a clear continuous resin film which was water-soluble.

*Example VI*

The melamine-formaldehyde intermediate described in Example I and prepared under slightly alkaline conditions was diluted to 20% solids. To 78 parts of this solution equivalent to 0.1 mole melamine, 34 parts of 87% ortho phosphoric acid (0.3 mole) were added and reaction carried out at 50° for 30 minutes. When dried at 50° this yielded a clear resinous solid. Upon heating in water at 25% solids this product swelled and gradually dispersed to a slightly viscous hazy solution.

What is claimed is:

1. An essentially dry, water-dispersible, cationic resinous composition which forms an acid colloid when redispersed in water, prepared by dehydrating, at a temperature not exceeding about 65° C., an aqueous, cationic composition comprising the reaction product of (A) an aqueous resinous syrup prepared by reacting formaldehyde and an aminotriazine compound selected from the group consisting of a melamine, a formoguanamine, an acetoguanamine and a propioguanamine in aqueous medium at a temperature of from about 20° C. to reflux temperature and a pH of from about 6 to 12 to give a thermosetting resinous condensate in syrup form, wherein the formaldehyde is introduced into the sphere of reaction in amounts approximating 1/$n$th of the total quantity of formaldehyde to be introduced, $n$ times, where $n$ is an integer of at least 2 the mol ratio of formaldehyde to said aminotriazine compound being from about 0.9:1 to about 1.2:1, respectively, and the resin solids content of said condensate in said syrup being not greater than about 65%, and (B) an acid selected from the group consisting of hydrochloric, sulfuric, phosphoric, trichloracetic and lactic, the mol ratio of said (B) to said aminotriazine compound being from about 0.7:1 to about 3:1, respectively, the reaction between said (A) and said (B) being carried out at a temperature of from about 20° C. to 75° C. and a solids content of about 10% to 50% and for a sufficient period of time to age the resulting condensate to a colloidal condition wherein colloidal particles carry a positive electrical charge.

2. An essentially dry, water-dispersible, cationic resinous composition as described in claim 1 wherein said aminotriazine compound is a melamine.

3. An essentially dry, water-dispersible, cationic resinous composition as described in claim 1 wherein said aminotriazine compound is melamine.

4. An essentially dry, water-dispersible, cationic resinous composition as described in claim 1 wherein said aminotriazine compound is formoguanamine.

5. An essentially dry, water-dispersible, cationic resinous composition as described in claim 1 wherein said aminotriazine compound is acetoguanamine.

6. An essentially dry, water-dispersible, cationic resinous composition as described in claim 1 wherein said aminotriazine compound is propioguanamine.

7. An essentially dry, water-dispersible, cationic resinous composition as described in claim 1 wherein said aminotriazine compound is a melamine, said (B) is hydrochloric acid, and the mol ratio of said (B) to said melamine is from about 0.7:1 to 1.3:1, respectively.

8. An essentially dry, water-dispersible, cationic resinous composition as described in claim 1 wherein said aminotriazine compound is melamine, said (B) is hydrochloric acid, and the mol ratio of said (B) to said melamine is from about 0.7:1 to 1.3:1, respectively.

9. An essentially dry, water-dispersible, cationic resinous composition as described in claim 1 wherein said aminotriazine compound is formoguanamine, said (B) is hydrochloric acid, and the mol ratio of said (B) to said formoguanamine is from about 0.7:1 to 1.3:1, respectively.

10. An essentially dry, water-dispersible, cationic resinous composition as described in claim 1 wherein said aminotriazine compound is acetoguanamine, said (B) is hydrochloric acid, and the mol ratio of said (B) to said acetoguanamine is from about 0.7:1 to 1.3:1, respectively.

11. An essentially dry, water-dispersible, cationic resinous composition as described in claim 1 wherein said aminotriazine compound is propioguanamine, said (B) is hydrochloric acid, and the mol ratio of said (B) to said propioguanamine is from about 0.7:1 to 1.3:1, respectively.

References Cited in the file of this patent

UNITED STATES PATENTS

| | | |
|---|---|---|
| 2,345,543 | Wohnsiedler | Mar. 28, 1944 |
| 2,356,718 | Wohnsiedler | Aug. 22, 1944 |
| 2,841,571 | Wohnsiedler | July 1, 1958 |
| 2,918,453 | Widmer | Dec. 22, 1959 |
| 2,986,489 | Maxwell | May 30, 1961 |